Nov. 8, 1949     L. S. WILLIAMS     2,487,288
BELLOWS CONSTRUCTION
Filed March 23, 1946
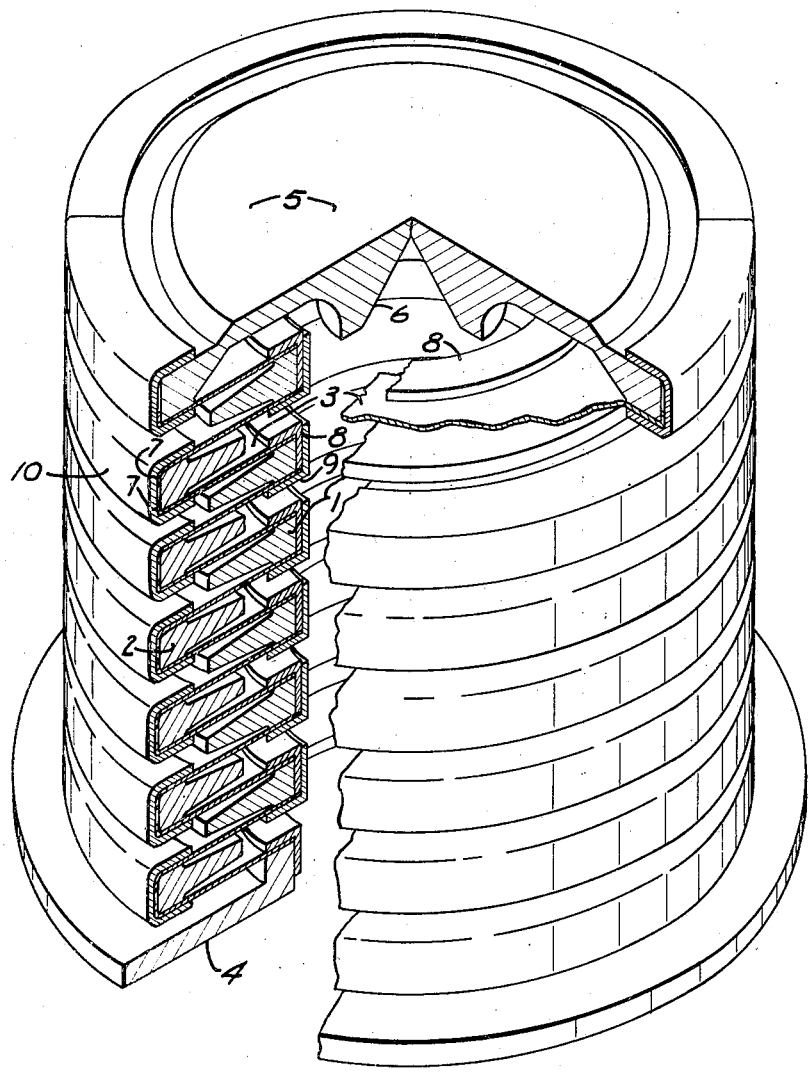
INVENTOR.
Lawrence S. Williams
BY
Marshall, Marshall & Leonard
ATTORNEYS Patented Nov. 8, 1949

2,487,288

UNITED STATES PATENT OFFICE 2,487,288

BELLOWS CONSTRUCTION

Lawrence S. Williams, Toledo, Ohio, assignor to Toledo Scale Company, Toledo, Ohio, a corporation of New Jersey Application March 23, 1946, Serial No. 656,760

3 Claims. (Cl. 137—156.5)

This invention relates to hydraulic force transmission means, and more particularly to the receiving sections of the hydraulic force transmission means.

In hydraulic force transmission systems there usually is employed a closed system having a force generating device and a force responsive section, the force generated in the generating device being transmitted through the hydraulic fluid to the force receiving section and counterbalanced (in the case of weighing or measuring instruments) either by the resistance of the force receiving section itself or by means of auxiliary mechanisms such as counterbalancing weights or springs. The force receiving section in such devices often consists of one or more bellows. The bellows may receive pressure either internally or externally or there may be a combination of internal and external bellows.

Bellows which have been employed in the past generally have been constructed from what might be called corrugated tubing, that is, the bellows have been substantially tube-shaped but the walls in cross section are corrugated or displaced in curves on both sides of the center line. This makes the structure flexible and permits its elongation or shortening under the influence of internal or external pressure as the case might be. Bellows of this type may be formed in either one of two processes. The first of these processes is to roll corrugations into a sheet of metal and then to form a tube-like structure of the corrugated metal and seal the edge. The second method is a reversal of this process; i. e., to form a tube from the sheet of metal and then to roll the corrugations into the tube. In either case, complex machinery is required and the characteristics of the bellows, i. e. its spring rate and stability are hard to control inasmuch as the rolling operations tend to shift the metal and the maintenance of a uniform cross section is difficult.

The maintenance of a uniform cross section is extremely important since it determines the pressure to force ratio of the bellows and it is desirable that this ratio be "straight line," i. e. that the increment of force exerted by the bellows be the same for each equal increment of pressure which is applied to it.

It is the principal object of this invention to provide a bellows construction in which the characteristics of the annular members making up the bellows can be predetermined and controlled and are not likely to be changed during manufacture.

It is another object of this invention to provide a bellows construction in which the cross section and stresses of the walls can be maintained uniform throughout the entire assemblage.

It is another object of this invention to provide a bellows structure which can be manufactured without requiring expensive and complex rolling and forming machines.

These and other objects are attained by providing a "built up" bellows structure in which annular members are assembled in fewer or greater numbers as desired and are reinforced in assembly to provide bellows of different sizes and characteristics.

The single figure is an isometric view with parts broken away to show the detail of construction of the improved bellows.

The improved bellows illustrated in the figure is designed to maintain its effective area precisely constant regardless of the applied pressure. To accomplish this the bellows is constructed with inner and outer annular diaphragm supports 1 and 2. A plurality of generally flat annular diaphragms 3 are secured to and supported by the annular supports 1 and 2.

The lowermost of the diaphragms 3 is supported on a ring-shaped base 4 while the uppermost diaphragm is sealed to a cap 5 closing the upper end of the assembled bellows. The cap 5, on its under surface has a conical recess 6 to receive the pointed upper end of a strut, not shown, that forms a mechanical connection to the bellows. This bellows, as shown, is designed to operate within a fluid chamber so as to receive the hydraulic pressure against its outer surface.

By a simple redesign of the base 4 and cap 5 the bellows may be adapted to receive the pressure internally.

One of the problems in constructing a bellows is to avoid uneven stress distribution in the diaphragms. This uneven stress must be avoided so that the effective area of the diaphragm does not change materially as the pressure is applied. Welding of the thin diaphragm material is not entirely satisfactory because of local strains set up in the diaphragm material.

In the illustrated construction welding or soldering is avoided. Rather the annular diaphragms are sealed with heat hardening synthetic resin adhesives. To insure a fluid tight seal the diaphragms 3, after being preformed with raised outer rims 7, are clamped to the inner annular diaphragm supports 1 by interlocking clamp rings 8 and 9. In making up the assembly one of the diaphragms 3 after being coated with resin is laid on one of the supports 1 and one of the clamp rings 8 is forced into place. Then the partial assembly is turned over and another diaphragm 3 is clamped by forcing one of the rings 9 into place. The clamping forces do not create any stress in the annular diaphragms themselves.

After the inner supports 1 and diaphragms 3 have been assembled into partial assemblies these are then built up to form the complete bellows.

This assembly is accomplished by interposing one of the outer supports 2 between each subassembly with the rims 7 of the diaphragms 3 snugly fitting over the outer rims of the support 2. Channel cross-section split rings 10; two for each of the supports 2 are then pressed into place to clamp the diaphragms 3 to the supports 2 or the cap 5.

After the assembly is completed it is placed in an oven and heated sufficiently to harden the resin adhesive.

While a heat hardenable adhesive has been mentioned other low temperature metal bonding materials are equally serviceable. The required characteristic is that the material form a liquid tight gasket between the metal surfaces.

This construction in which practically no working of the diaphragm material occurs produces a bellows having a very accurate force to pressure translation ratio.

Various modifications in the details of the improved bellows may be made without departing from the spirit and scope of the invention.

Having described my invention, I claim:

1. A bellows structure comprising comparatively large rigid annuli alternating with smaller rigid rings and resiliently flexible washer-like members one of said members being interspersed between each successive annulus and ring and connecting said annuli and said rings, flanged annular members for holding inner edges of said washer-like members and said rings together and channelled annular members for holding outer edges of said annuli and said washer-like members together, the joints between said annuli and said washer-like members and between said washer-like members and said rings being fluid tight.

2. A bellows structure comprising comparatively large rigid annuli alternating with smaller rigid rings and resiliently flexible washer-like members, one of said members being interposed between each successive annulus and ring and connecting the annulus and the ring, said members being sealed to said ring, and channelled annular members formed over said annuli and members for holding the members to the annuli to form a fluid tight joint.

3. A bellows structure comprising comparatively large rigid annuli alternating with smaller rigid rings and resiliently flexible washer-like members, one of members being interposed between each successive annulus and ring and connecting the annulus to the ring, flanged annular members for holding the members to the rings, and means for sealing the members to the annuli, the joints between the washer-like members and the rings and annuli being fluid tight.

LAWRENCE S. WILLIAMS.

REFERENCES CITED

The following references are of record in the file of this patent:

UNITED STATES PATENTS

| Number | Name | Date |
| --- | --- | --- |
| 1,997,565 | Arbuckle | Apr. 16, 1935 |
| 2,071,583 | Schutt | Feb. 23, 1937 |
| 2,223,691 | Lockwood | Dec. 3, 1940 |
| 2,243,522 | Conklin | May 27, 1941 |
| 2,323,985 | Fausek | July 13, 1943 |

FOREIGN PATENTS

| Number | Country | Date |
| --- | --- | --- |
| 31,700 | France | of 1927 |